United States Patent [19]

Becking

[11] Patent Number: 5,207,854
[45] Date of Patent: May 4, 1993

[54] CONTINUOUS LOOP RIBBON WELDING SYSTEM

[76] Inventor: Paul E. Becking, 13795 Vista Dorada, Salinas, Calif. 93908

[21] Appl. No.: 594,659

[22] Filed: Oct. 9, 1990

[51] Int. Cl.⁵ .................. B65H 69/02; B32B 31/00
[52] U.S. Cl. ........................ 156/350; 156/494;
  156/502; 156/510; 156/580.1; 156/526;
  156/157; 156/250; 156/73.4; 425/174.2; 264/23
[58] Field of Search ............ 156/73.3, 73.4, 73.5,
  156/157, 250, 526, 580, 580.1, 580.2, 494, 495,
  502, 510, 350, 351; 264/23; 425/174.3; 228/1.1;
  242/58.5, 147 R, 149; 226/44; 100/43, 33 PB

[56] References Cited

U.S. PATENT DOCUMENTS

| | | | |
|---|---|---|---|
| 3,442,735 | 5/1969 | Stensaker | 156/73.5 |
| 3,821,048 | 6/1974 | Acker et al. | 156/73 |
| 4,096,019 | 6/1978 | Lehmann | 156/494 |
| 4,119,448 | 10/1978 | Hermanson et al. | 156/73.4 |
| 4,482,421 | 11/1984 | Gurak | 156/580.1 |
| 4,629,530 | 12/1986 | Becking | 156/502 |
| 4,935,081 | 6/1990 | Becking | 156/157 |

Primary Examiner—David A. Simmons
Assistant Examiner—J. Sells
Attorney, Agent, or Firm—Ned L. Conley

[57] ABSTRACT

There is provided a method and apparatus for adjoining two ends of a length of impact printer ribbon to form a continuous loop of ribbon. A welding fixture, including a welding anvil, ironing anvil and ultrasonic horn are provided to join the ribbon ends. Tensioning slides are provided to grip the ribbon ends and tension the ribbon during welding operations. A microprocessor controls a series of pistons, switches and solenoids to control the welding sequence.

14 Claims, 11 Drawing Sheets

CONTINUOUS LOOP RIBBON WELDING SYSTEM

BACKGROUND OF THE INVENTION

This invention relates generally to the art of manufacturing ribbon cartridges for use with printers for equipment such as computers and word processors. More particularly, the invention provides a method and apparatus for efficiently and accurately adjoining the ends of a length of ribbon so as to form a continuous ribbon loop extending through a ribbon cartridge. Still more particularly, the present invention relates to a printer ribbon welding equipment system that joins two ribbon ends in a cross pattern while controlling the tension of the two ribbon ends at the place of joinder.

Continuous loop printer cartridges are in very common use throughout the world. In simple terms, they comprise a length of nylon, or other fabric ribbon, loaded in serpentine fashion within a cartridge casing and adjoined at the two ends to form a continuous loop. The weakest point along the ribbon loop, and thus the point that typically breaks soonest during use, is the fusion weld which joins the two ribbon ends. Thus, efforts to improve the durability of continuous loop ribbon cartridges concentrate on improvements to the method and apparatus for forming the weld.

U.S. Pat. No. 4,629,530, which is expressly incorporated herein by reference, describes what is presently the most commonly used method and apparatus for joining two ribbon ends to form a continuous loop. The method and apparatus described in this patent is a substantial improvement over the "crash welding" technique previously in common use. Crash welding involves a simultaneous welding and cutting operation which imparts an excessive amount of energy into the fabric ribbon, weakening the ribbon weld and shortening the expected life of the cartridge.

In the improved technique described in U.S. Pat. No. 4,629,530, an operator clamps the two ribbon ends in criss-cross or x-pattern configuration across the top of an anvil having a narrow upper land surface (see FIG. 1 of U.S. Pat. No. 4,629,530). An ultrasonic horn moves into position above the crossed ribbon ends and the anvil, and without crushing the ribbon ends to a point of damage against the anvil, imparts ultrasonic energy into the ribbon ends, fusing the ribbon ends along a line defined by the adjacent land surface of the anvil.

Next, a separate cutter mechanism severs the two ends of the fused ribbon along the edge of the weld line or bead (see FIG. 2 of U.S. Pat. No. 4,629,530), and a mechanism rotates the upper ribbon 180° to give a continuous length of ribbon joined along a diagonal weld bead (see FIG. 3 of U.S. Pat. No. 4,629,530). The weld formed by this technique leaves a distinct nub (see FIG. 4A of U.S. Pat. No. 4,629,530) that is unacceptable in terms of ribbon cartridge performance. Consequently, this technique typically also includes a second welding operation whereby the weld bead on the unfolded ribbon ends is reheated and flattened to reduce the nub to acceptable dimensions.

To achieve maximum weld strength, the ribbon ends must be placed in tension during the weld process. U.S. Pat. Nos. 4,629,530 and 3,821,048 disclose stretching, or tensioning of the ribbon, prior to and during the welding operation. In U.S. Pat. No. 4,629,530, it is noted that the ribbon is held taught by the operator before the clamping apparatus grips the ribbon for welding. Col. 26, lines 10 to 22. In U.S. Pat. No. 3,821,048, the ribbon is tensioned by ribbon tensioning feet which stretch the ribbon into ribbon tensioning cavities as the ribbon is gripped in the ribbon positioning groove for welding. Col. 4, lines 33 to 42. However, there is no disclosure of the need to, or means for, adjusting the tension for different ribbon structures, size or ink formulas.

Maximum weld strength is also affected by the quantity of tensioning, or total tension force. Too much tension can be as detrimental to achieving optimum weld strength as no tensioning whatsoever. Further, the amount of tension force necessary to impart the maximum strength weld in a ribbon varies greatly from ribbon composition to ribbon composition. This variation occurs as a result of variations in the ribbon material, and as a result of variations in the composition of the ink which is often preloaded into the ribbon prior to the welding process.

Different ribbon materials will contain different amounts of nylon, or different grades of nylon, which react differently to the ultrasonic welding process. Likewise, there may be as many as two thousand compositions of ink which may be used with cartridge ribbons. Therefore, the combinations of ribbon and ink result in a great variation of ribbon welding properties. The proper welding tension for each ribbon or ribbon and ink combination is usually determined by trial and error, by welding the ribbon at different tensions and then testing the weld strength to obtain an optimum weld strength tension. However, as the tension imparted during the welding operation is in large part based upon a given operator's feel for tension, the optimum tension is commonly not readily reproducible from operator to operator, and each operator must determine the feel required to impart the optimum tension. Further, as the operator's shift progresses, or when the operator resumes operation after a break or day or days off from the operation, the requisite feel may change leading to non-optimum welding tension.

Thus, it is apparent that it would be advantageous to develop a method and apparatus for controlling ribbon tension during welding which is independent of the operator's perception of the proper tension.

SUMMARY OF THE INVENTION

Accordingly, there is provided herein a method and apparatus for adjoining the ends of a ribbon to form a continuous loop of ribbon within a printer ribbon cartridge. The apparatus of the present invention comprises a welding fixture which facilitates a precision welding process whereby the two ends of the ribbon are adjoined. The welding fixture includes a plate for supporting portions of the fixture, guide means for use in precisely positioning the ribbon ends in a crisscross arrangement, clamping means which automatically clamps the ribbon to the plate, a tensioning means for tensioning the ribbon to a preselected value and a cutting means which precisely cuts the welded ribbon in an operation separate and distinct from the welding operation.

The guide means includes four pairs of guide bars positioned on the fixture so as to define crisscrossed alignment paths. The width of the spacing between the bars of any one pair is quickly and easily adjusted by a left and right lead screw mechanism supporting the bars. The guide means thereby provides a precision ribbon alignment guide and is easily adjusted for various widths of ribbons.

The clamping means includes a ribbon clamp and a ribbon clamp switch near each left side pair of guide bars. The ribbon clamp switches are positioned along the centerlines of the alignment paths, so that when one length of ribbon is held by the operator in two hands along one alignment path, the pertinent ribbon clamp switch is directly beneath the operator's left hand. The clamp switches can therefore easily be depressed while the ribbon end is held tautly along the alignment path.

The tensioning means includes a tensioning slide which supplies a force to one of the clamp means attached to each of the two ribbons. To supply tension, the slide is attached to a double ended air bearing piston which is mounted at one end to the welding fixture. Air, or other pressure media, are supplied to the tension side of the piston to impart a preselected force through the clamp means to the ribbon to cause the proper tensioning.

When the clamp switches are depressed, the control system of the welding fixture causes a ribbon clamp to rotate into position above the ribbon and then drop directly onto the ribbon, clamping it against the plate below. The clamping means thus provides an effective apparatus for securing the ribbon ends into the alignment means.

After the ribbon ends have been clamped at four corners into the alignment means, the tension slide actuates to impart a preselected tension on each ribbon end, and the operator actuates a welder apparatus which performs a welding operation. During the welding operation, a welder horn is lowered into contact with the crisscrossed ribbon ends. A welding anvil, having an upper land surface with a width of approximately 0.010 to 0.020 inch and a length of an inch or more, supports the ribbon ends at their crossing point from the lower side thereof. The welder horn presses the ribbon ends against the welding anvil and ultrasonically vibrates the ribbon material, thereby heating it and fusing it along a line conforming substantially to the dimensions of the land surface of the welding anvil. The ribbon ends are not severed by the welder horn. Hence, the welder horn never contacts the welding anvil. The welding fixture includes a separate cutter mechanism for performing a precision cutting operation.

The cutter mechanism includes a lower cutting blade supported on the plate below the ribbon, a cutter housing pivotally supported above the ribbon, an upper cutting blade attached to the cutter housing, and means for pivoting the upper cutting blade into position adjacent to the lower cutting blade. The cutter mechanism includes a clamping surface which holds the ribbon firmly in position against lower cutting blade during the cutting operation. Lower cutting blade is formed from an upper area of first welding anvil, conformed to form a cutting surface. After the welding operation, the pivoting means causes the cutter housing to move from an upper position to a lower position adjacent to the welded ribbon and causes the upper and lower cutting blades to sever the ribbon precisely along a predetermined path within the bead. The cutter mechanism thereby improves the strength of welds by precisely controlling the position of the cut along the weld bead. The cutter mechanism also diminishes wear on the welder apparatus, and its attendant expense, by separating the cutting operation from the welding operation. By separating the cutting means from the welding means the energy values of ultrasonic welding may be adjusted between the first and second weld operations.

The welding fixture also includes a pair of arm assemblies for manipulating the ribbon ends. Each assembly includes an arm which is pivotally supported on the fixture, a thumb at the end of each arm, and a finger which pivotally closes against the thumb for grasping therebetween a ribbon end. A first arm assembly, known herein as the right arm assembly, is arranged for disposing of the ribbon ends severed during the cutting operation. A second arm assembly, or left arm assembly, is arranged to rotate a ribbon end 180 degrees to remove therefrom a twist and straighten the welded ribbon into a straight line. Both arm assemblies operate automatically in response to a control system.

After the cutting operation and after the left arm assembly has straightened the ribbon, a second weld or ironing operation is performed. During the second weld operation, the welding anvil is replaced with an ironing anvil, which has an upper land surface with a width substantially greater than that of the land surface of the welding anvil. With the ironing anvil positioned beneath the welded ribbon, the welding apparatus is lowered into contact with the ribbon for a second time and the ribbon is again ultrasonically heated. The weld bead formed during the first welding operation is flattened and widened during the ironing operation. As the microprocessor controller may be preprogrammed to control the intensity and duration of welding, the second weld parameters may be selected independent of the first weld parameters.

The welding fixture is controlled, in substantial part, by a pneumatic control system. The control system includes a source of pressurized fluid, a plurality of microprocessor controlled valves, and a plurality of pneumatic cylinders. Each cylinder provides the means by which portions of the fixture, such as clamps, arms, and fingers are caused to move. After all operations have been completed, the fixture unclamps the ribbon and returns all apparatus to its starting positions. Each of the mechanical steps is controlled by a microprocessor controller.

The present invention is the first welding fixture to provide the industry with all the features necessary to produce consistently a high quality weld in a continuous loop ribbon. Precise control of the ribbon end tension during the welding operation provides consistent high strength continuous ribbons. Precise alignment of ribbon for the majority of ribbon sizes eliminates one problem and results in continuous loop ribbons which are consistently straight in the region of the weld. Separating the cutting operation from the welding operation substantially reduces wear on the welder horn, which never contacts the welding anvil in the present invention, and thereby the ribbon manufacturer has reduced the replacement costs of worn welder horns, anvils and cutting blades. The use of a separate precision cutter mechanism produces weld beads of repeatable, consistent, predetermined widths, thereby enabling one to control better the strength of the weld.

These and various other objects and advantages of the invention will become readily apparent to those skilled in the art upon reading the following detailed description and claims and by referring to the accompanying drawings.

DESCRIPTION OF THE PREFERRED EMBODIMENT

Figure 1:
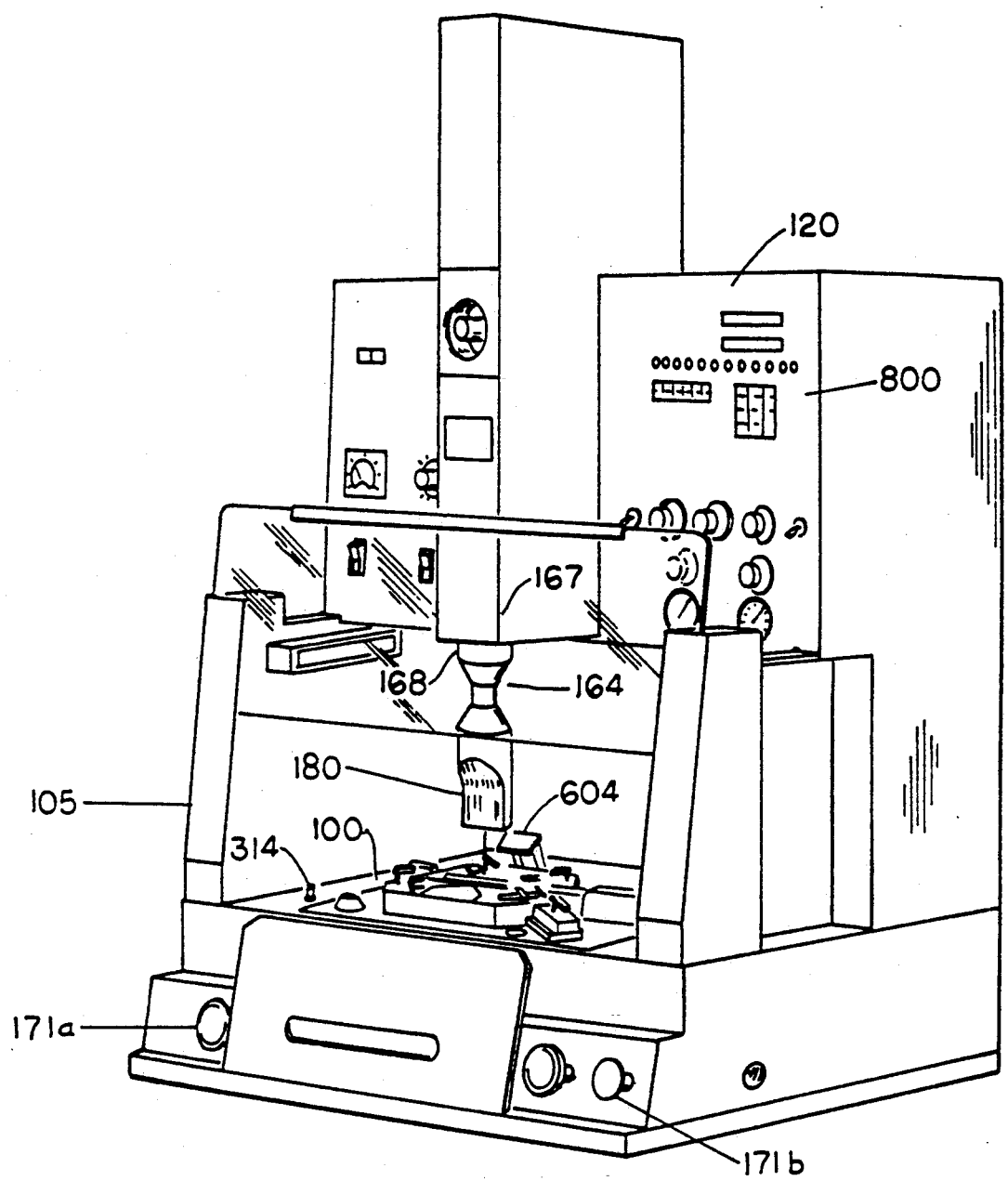
FIG. 1 shows a perspective view of a welding apparatus constructed according to the principles of the present invention.

The general operation of a continuous loop welding system is well known in the art, and reference is made to the disclosures of U.S. Pat. Nos. 4,629,530 and 4,935,081, which are expressly incorporated herein as though fully set out herein, for further details of the well known operating features of these apparatus. The general principles of the present invention, as already described, remain unchanged. Where possible, portions of the invention described in U.S. Pat. Nos. 4,629,530 and 4,935,081 will be identified by the reference characters previously used.

The Basic Process

Figure 1A:
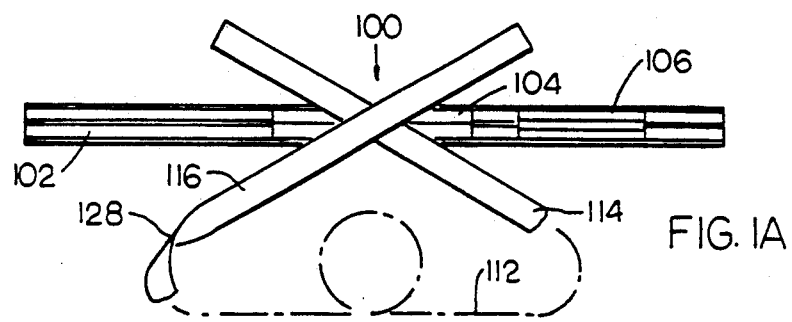
FIGS. 1A to 1C show a diagrammatical overview of the general ribbon welding process performed in accordance with the principles of the present invention.
Figure 1B:
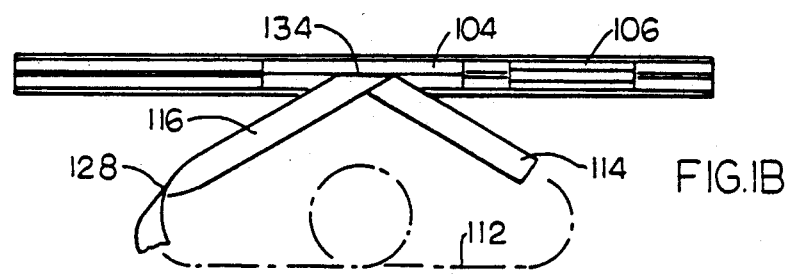
Figure 1C:
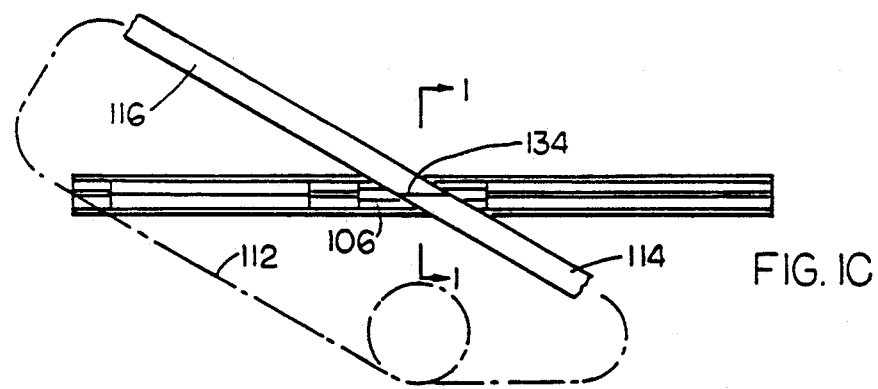
Figure 1D:
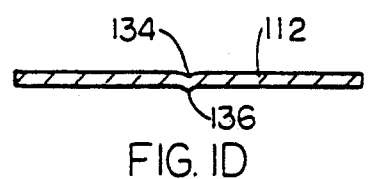
FIGS. 1D and 1E show the welded ribbon depicted in FIG. 1C in cross section along a line 1—1 shown in FIG. 1C.
Figure 1E:
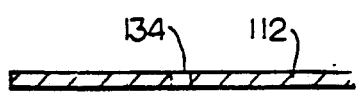
Figure 2:
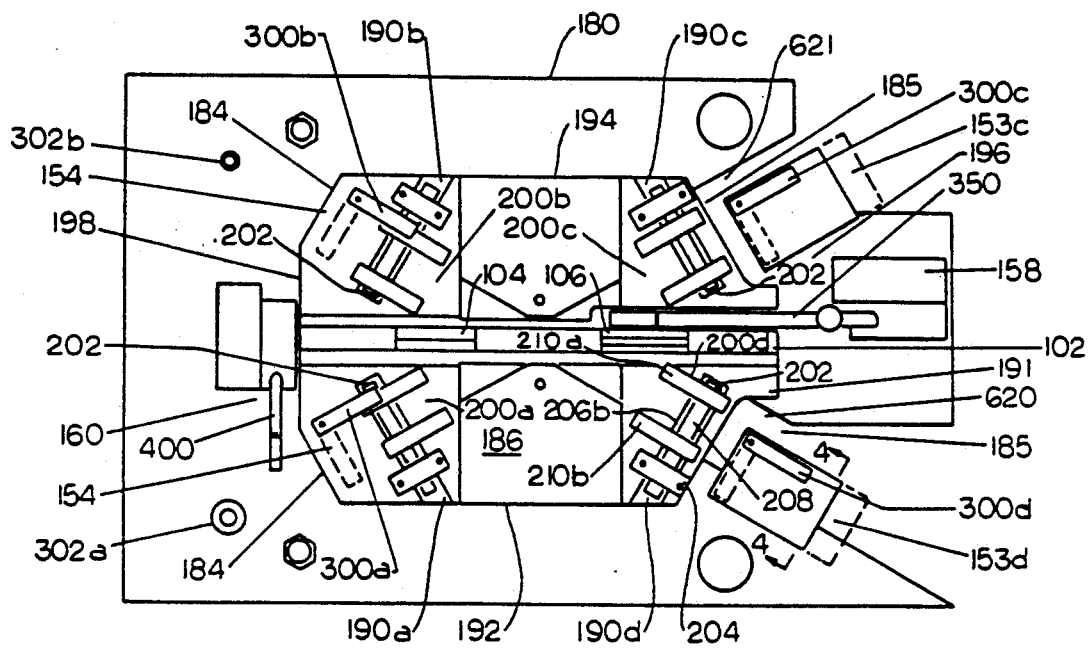
FIG. 2 is a top view of the welding fixture disposed in the welding apparatus of FIG. 1.

FIGS. 1A to 1C and FIGS. 1 to 4 of U.S. Pat. Nos. 4,629,530 and 4,935,081 disclose the basic process for which the present invention is used. Generally, as shown in FIGS. 1 and 2 herein, a welding fixture 100 is provided with a v-shaped track 102, a welding anvil 104 and an ironing anvil 106. As shown in FIGS. 1A to 1E, a pair of ribbon ends 114, 116 are placed, in criss-cross fashion, over the welding anvil 104. Ribbon ends 114, 116 form the ends of ribbon 112. Ribbon end 116 is folded over at fold 128, adjacent welding fixture 100, such that after welding, end 116 may be folded back over fixture 100 to straighten ribbon 112. The acute angle between the two segments of ribbon end, which is bisected by v-shaped track 102, is 60°. After the ribbon ends are properly positioned, a welder head is lowered adjacent the intersection, and a weld bead is placed across the intersection substantially collinear with the v-shaped track 102. A cutter then trims the ends of the ribbon, forming a flat end 134. One of the ribbons is then folded over to reveal a nub 136, which is then flattened over the ironing anvil 106 by a second application of the welding horn 170.

The Welding Fixture

Figure 3:
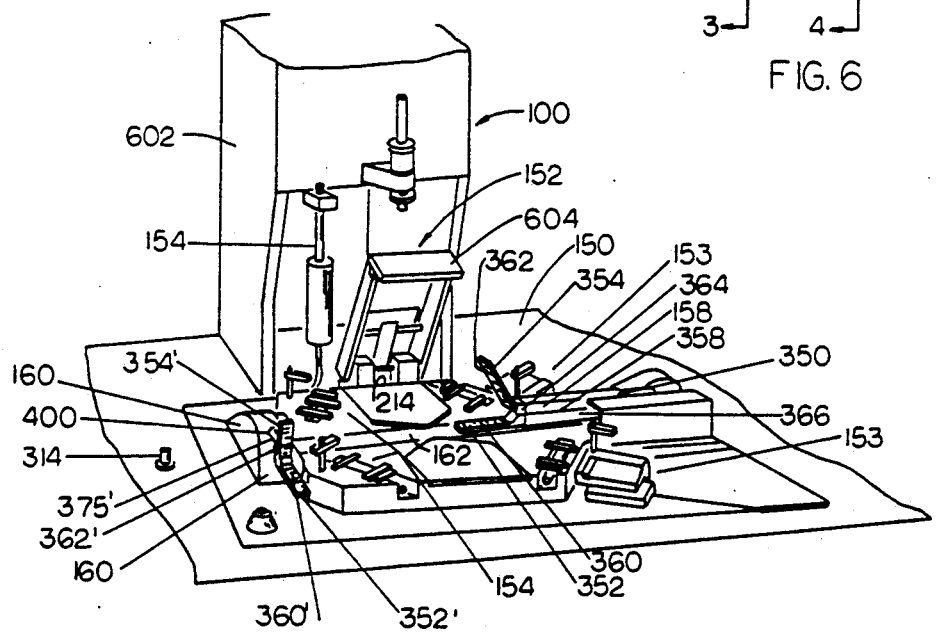
FIG. 3 is a partial perspective view of the welding apparatus of FIG. 1 with the welding fixture of FIG. 2 disposed thereon.

Referring now to FIGS. 1, 2 and 3, there is shown therein a welding fixture 100 structured according to the principles of the invention. The welding fixture 100 includes a guide and switch plate assembly 150, a cutter assembly 152, two ribbon clamp assemblies 154a, b, two ribbon clamp and tension assemblies 153c, d, a right arm assembly 158, a left arm assembly 160 and a track assembly 162.

Referring briefly to FIG. 1, there is shown a welder apparatus 164 with the welding fixture 100 positioned thereon. The welding apparatus 164 includes a welding horn 170 extending downwardly toward fixture 100 from a welder housing 167 on welder piston 168. Welder housing 167 includes a pair of actuation switches 171a, 171b, which are simultaneously actuated in push-button fashion to initiate the downward stroke of the welder piston 168. A micrometer 173 (FIG. 3) is provided for fine adjustment of welder piston travel. The micrometer 173 actuates a bar to engage a second bar on welder piston 168, to limit the downward stroke of horn 180.

Guide and Switch Plate Assembly

Referring now to FIG. 2, there is shown a switch plate 180 adjustably supported on four columns (not shown). The columns support the switch plate 180 during welding and trimming operations. Switch plate 180 further includes guide plate 186 disposed thereon. The end faces 184 of the two left hand corners of the guide plate 186 are bevelled, and the end faces 185 of the two right hand corners of guide plate 186 are configured with a more severe, or deeper, bevel, leaving the right end 196 of the guide plate with a bottle neck configuration 191. The guide plate further includes, disposed down the center of the lengthwise direction thereof, V-shaped cut or track 102. The guide plate includes level adjusting apparatus (not shown) to level the guide plate during the welding, cutting and flattening operations.

Referring still to FIG. 2, an adjustment channel 190a-d is machined into the upper surface of the guide plate 186 in each of the four corners thereof. Front adjustment channels 190a, 190d extend from a front lengthwise face 192 of the guide plate 186 toward, but not intersecting, right and left ends 196, 198, respectively. The centerlines of the front adjustment channels 190a, 190d form acute angles of 60 degrees with respect to the plane of the front face 192 of guide plate 186. The orientation of the two rear adjustment channels 190b, 190c relative to the rear lengthwise face 194 of the guide plate 186 is symmetric with respect to the centerline of the V-shaped track 102 to the two front adjustment channels 190a, 190d.

There is included within each adjustment channel 190 a left and right lead screw adjustment mechanism 200a–d. The lead screw mechanism 200 of each adjustment channel 190 is identical, so that description of a single mechanism 200 shall suffice as a description of all four mechanisms. Each mechanism 200 includes a shaft 202 rotatably supported along the centerline of the adjustment channel 190 by a support housing 204. The support housing 204 is affixed to the upper surface of the guide plate 186 by means of screws. The shaft 202 includes opposing left and right threads 206a, 206b disposed symmetrically about a center alignment space 208. A pair of guide bars 210a, 210b include opposing threaded bores therethrough for receiving the opposing left and right threads 206a, 206b, respectively, of the threaded shaft 202. The guide bars 210a, 210b extend generally perpendicularly from the shaft 202 toward the center of the guide plate 186. Rotation of the shaft 202 causes simultaneous movement of the guide bars 210a, 210b either toward or away from one another, depending upon the direction of rotation of the shaft 202.

The position of the center alignment point 208 within the adjustment channel 190d, as determined by the position at which the support housing 204 is attached to the guide plate 186, is selected so that a perpendicular projection from the shaft 202 through the center of the space 208 passes through a corresponding center point of a space 208 on a corresponding shaft 202 within the opposing adjustment channel 190b. The left and right lead screw mechanisms 200 are similarly positioned within the second opposing pair of adjustment channels 190a, 190b. The guide bars 210a, 210b from each of the four lead screw mechanisms 200 thereby define with precision the alignment path of the ribbon which is to be welded. Rotation of the shaft 202 permits adjustment of the width of the alignment path whereby the operator may quickly and precisely alter the set-up of the welding fixture 100.

The Ribbon Clamp Assemblies

Referring still FIG. 2, there is depicted therein two ribbon clamps 300a, 300b in fully open position and two corresponding button-actuated clamp switches 302a, 302b. The ribbon clamps 300a, 300b are positioned in each of the two bevelled end faces 184 of the guide plate 185 so as to assume a position in contact with the guide plate 186, adjacent and parallel to a corresponding adjustment channel 190a, 190b, when actuated. The clamp switch 302a is positioned on and within the switch plate 180 near the corresponding ribbon clamp 300a, and is centered on a line which intersects the center point of the center spaces 208 of the shafts 202 affixed within the alignment channels 190a, 190c. The clamp switch 302a is thereby collinear and is precisely aligned with the centerline of the ribbon placed in the fixture for welding. The clamp switch 302b is similarly arranged. When an operator actuates a clamp switch 302 by depressing it, the corresponding ribbon clamp 300 rotates through an arc of approximately 90 degrees and drops downward into contact with the upper surface of the guide plate 186 to grip the ribbon therebetween.

Referring still to FIG. 2, there is also depicted therein two ribbon tension clamps 300c, 300d. The ribbon tension clamps 300c, 300d are positioned in each of the two bevelled end faces 185 of the guide plate 186 adjacent necked down portion 191 so as to assume a position in contact with the guide plate 186, adjacent and parallel to a corresponding adjustment channel 190c, 190d, when actuated. When an operator actuates a clamp switch 302 by depressing it a second time after actuating clamp 300a, ribbon tension clamp 300c rotates through an arc of approximately 90 degrees and drops downward into contact with the upper surface of the guide plate 186 to grip the ribbon therebetween. Likewise, a second depression of clamp switch 302b causes ribbon tension clamp 300d to rotate through an arc of approximately 100° and drop downward into contact with the upper surface of the guide plate 186 to grip the ribbon therebetween.

The bevelled end faces 184, 185, at the corners of the guide plate 186 enable the operator to maintain the ribbon in alignment during the clamping process. Were the end faces of the corners not bevelled along a line parallel to the adjacent lead screw mechanism 200, the corner edges of the guide plate 186 would tend to bias the ribbon out of alignment as the ribbon clamp switches 302 are being depressed. Hence, the bevelled corners are an essential feature of the present invention.

Figure 5:
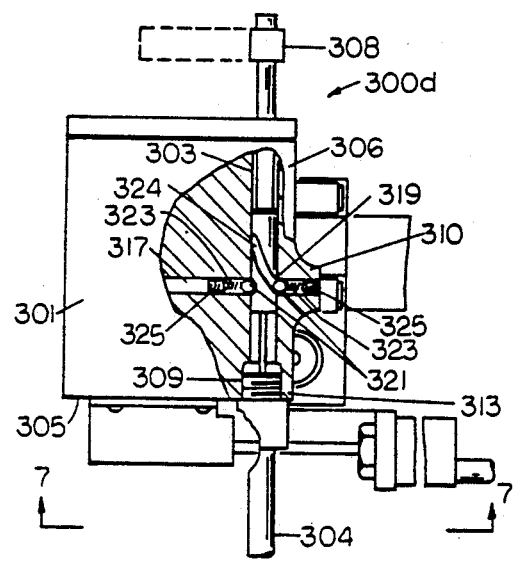
FIG. 5 is a rear view, partially in cutaway, of the tensioning mechanism of FIG. 4.
Figure 6:
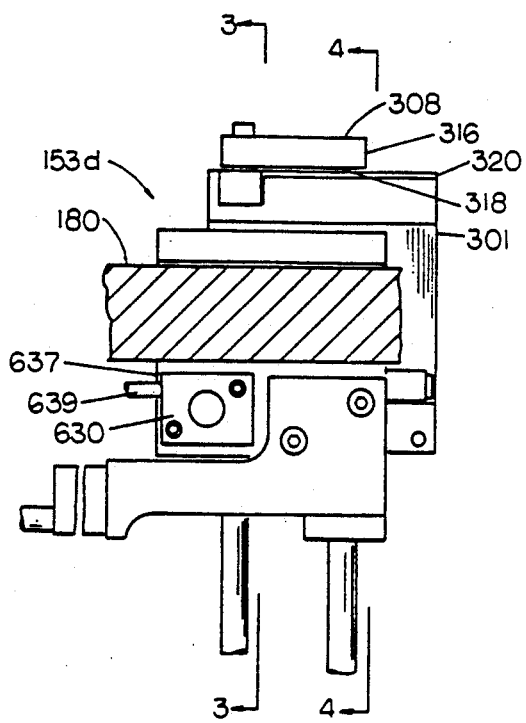
FIG. 6 is a front view of the tensioning mechanism of FIG. 5.

Referring now to FIGS. 5 and 6, the right front ribbon clamp and tension assembly 153d is depicted in elevation from the rear side. Ribbon clamp and tension assembly 153 includes ribbon tension clamp 300d mounted therein. Ribbon tension clamp 300d is mounted within slide 301 and includes a shaft 306, a gripper mechanism 308 and a shaft guide mechanism 310. A pneumatic cylinder 304 is positioned on the end 307 of shaft 306 terminating within slide 301. Slide 301 is a generally rectangular portion of metal, the dimensions and function of which will be set out in greater detail in the section entitled "The Ribbon Clamp and Tensioning Assembly". Slide 301 includes a through bore 303 terminating at the lower face 305 of slide 301 in a threaded counterbore 309. The cylinder 304 is affixed by means such as a threaded engagement into counterbore 309. End 307 of shaft 306 includes an enlarged diametrical portion having a threaded bore (not shown) therein. Cylinder 304 includes a piston rod 313 having a threaded end thereon, which threadingly engages the threaded bore in end 307 of shaft 306. The upper end of the shaft 306 extends above slide 301, to a point approximately 1.0 inch beyond the upper surface of the guide plate 186.

Figures 4, 13:
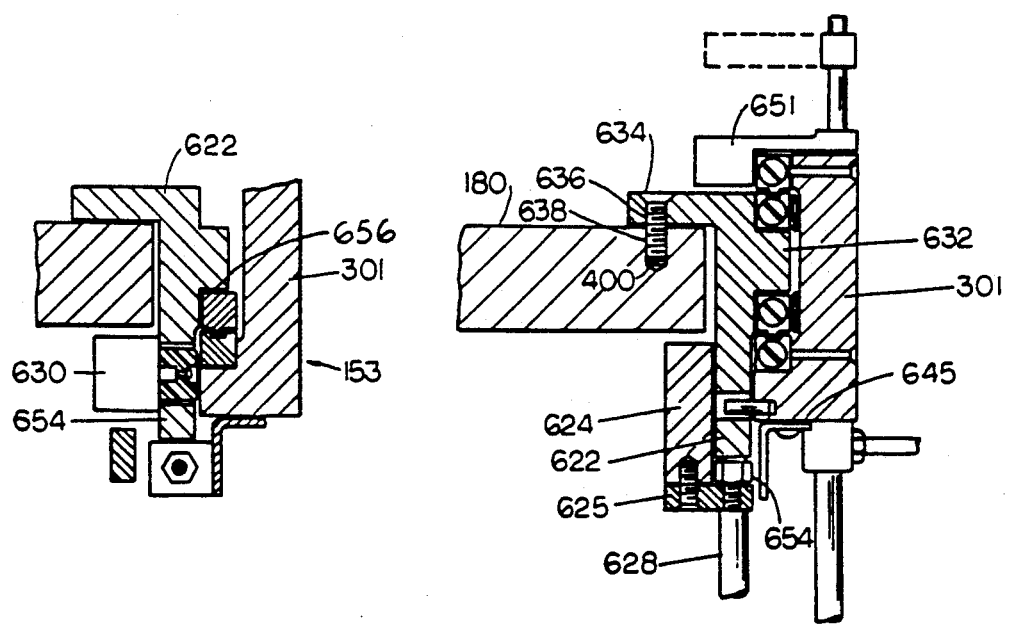
FIG. 4 is a sectional view of one of the tensioning mechanisms shown in FIG. 2 at section 4—4.
FIG. 13 is a partial view, in section, of the tensioning mechanism of FIG. 4 showing the piston lock assembly.

Referring now to FIGS. 4, 5 and 6, the gripper mechanism 308 includes a horizontal support bar 316 extending generally perpendicularly from and rigidly affixed to the upper end of the shaft 306. FIG. 5 depicts the gripper mechanism 308 in the disengaged position, whereas the gripper mechanism 308 is shown in the engaged position in FIG. 6. A flexible pad 318, for example, a block of rubber, is rigidly attached to the lower surface of the horizontal support bar 316 for adhesively gripping the ribbon against the upper surface of the guide plate 186. A second pad, 320, is disposed on the upper surface of slide 301 in alignment with the location with pad 318 when support bar 316 is actuated downward to pinch the ribbon between pads 318 and 320.

The lower end 307 of the shaft 306 includes a pair of spiral channels 324 arranged so as to be constantly 180 degrees opposed. Slide 301 includes therethrough a crossbore 317 which intersects bore 303 within slide 301. The longitudinal length of spiral channel 324 is configured such that when shaft 306 is fully inserted into bore 303, the upper terminus 319 thereof is disposed adjacent the intersection of crossbore 317 with bore 303. Channels 324 include a short vertical drop, for example 0.5 inch, across a spiral arc of approximately 90 degrees and end with a substantially vertical span, for example 0.5 inch, to a point near end 307. Crossbore 317 includes a minor diameter portion 331 therein projecting approximately one inch from either side of the intersection of crossbore 317 with bore 303. Minor diameter portion 331 is threaded, and a ball 321, spring 323 and plug 325 are disposed in each of portions 319 Ball 321 is disposed at the intersection of bore 303 and crossbore 317, and spring 323 is biased against ball and held in place by plug 325 threaded into the wall of minor diameter portion 319. Vertical motion of the shaft 306 causes balls 321 to engage the inside walls of the two spiral channels 324 and thereby rotate the shaft 306 on its vertical axis. The final vertical span of the spiral channels 324 within shaft 306 insures that the ribbon is gripped against the guide plate 186 from directly above the ribbon, so that the alignment of the ribbon is not disturbed. The relative dimensions of the apparatus comprising the ribbon tensioning clamp 300 are arranged so that the flexible pad 318 firmly engages the pad 320 on upper surface of slide 301 before downward vertical motion of the shaft 306 is obstructed by contact of shaft 306 with the upper end of cylinder 304.

The cylinder 304 further includes a pair of fluid ports 328a, b (328b not shown) for delivering and exhausting pressurized fluid from the interior of the cylinder 304, so as to generate vertical motion of the shaft 306.

Each of ribbon clamps 300a, b are similarly actuated by a pneumatic cylinder which supplies vertical actuation of the clamp to grip the ribbon. However, unlike ribbon tension clamps 300c and 300d, the shafts 306 supporting ribbon clamps 300a, b each include a cross pin projecting therethrough which is received in an groove in a bore located in a secondary guide mechanism located under switch plate 180. For details of this assembly, which is well known in the art, reference should be made to U.S. Pat. No. 4,629,530, Col. 14, line 55 to col. 15, line 64.

The actuation of ribbon clamps 300 a, b and ribbon tension clamps 300c, d are controlled by depression of the clamp switches 302 a, b. Each clamp switch 302a, b is a manually actuated microswitch, such as a microswitch manufactured by Micro Switch. Actuation of switch 302a transmits a signal to the microprocessor controller unit, which in turn sends a signal to a solenoid controlling the pressure feed lines on the pistons controlling ribbon clamps 300a,b and ribbon tension clamps 300c, d to actuate the clamp 300a–d to grip the ribbon. The controller is preprogrammed, or sequenced, to cause the ribbon tension clamp 300c or 300d to actuate to grip ribbon end before the corresponding ribbon clamp 300a or 300b engages the ribbon end. This sequence is further defined in the section entitled "The Operating Sequence".

The Right Arm Assembly

FIGS. 2 and 3 depict various views of the right arm assembly 158 in its inward position. FIG. 2 shows a top view of the switch plate 180 with the right arm assembly 158 positioned on the right side thereof. FIG. 3 depicts the right arm assembly 158 in perspective. Referring to FIGS. 2 and 3, the right arm assembly comprises an elongated arm 350, a thumb 352, a finger 354, a rotating mechanism, and a grasping mechanism 358.

The right arm assembly 158 is designated to rotate through a 180-degree arc between the inward horizontal position depicted in FIGS. 2 and 3 and an outward horizontal position where the arm 350 rests on the guide plate 186 in front of the right rear corner thereof. The right arm assembly 158 performs the service of grasping the waste ends of the ribbon and removing them from the fixture 100 after they have been severed from the welded ribbon.

The elongated arm 350 comprises a generally linear metallic element having a length sufficient to enable the thumb 352 and the finger 354, when closed, to grasp the left ribbon end at the right rear side of the guide plate 186. The outwardmost end of the elongated arm 350 is machined to define the thumb 352. Such machining may, for example include a reduction of the cross-sectional area of the element comprising the arm 350 for a short length, for example, 1.5 inches, to define the thumb 352. The inner surface of the thumb 352 is preferably machined to include a plurality of serrated edges or teeth 360 for the purpose of facilitating a secure grip on the ribbon.

The finger 354 similarly is formed of a machined metallic element having a cross section substantially similar to that of the thumb 352. The finger 354 includes teeth 362 arranged to mesh with the opposing teeth 360 of the thumb 352. The inner end of the finger 354 is pivotally attached to the arm at 350 at a point 364 near the thumb 352 and is also pivotally attached to a finger closure extension bar 366, which is coupled to a cylinder shaft so as to enable the finger 354 to rotate into the closed position in response to motion by the extension bar 366 along a single dimension. The details of the structure of the rotating mechanism and the operation of the right arm assembly 158 are well known to those skilled in the art, and such structure and operation is also disclosed in U.S. Pat. No. 4,629,530, col. 16, line 38 to col. 18, line 19, which disclosure had been expressly incorporated herein by reference.

Control of the right arm assembly is controlled by the microprocessor controller 120. After the cutter assembly trims the waste ribbon, as will be detailed further herein, the microprocessor controller sends a signal to a finger control solenoid to cause the small cylinder controlling the finger 354 to cause the finger 354 to engage the trim between thumb 352 and finger 354. The microprocessor controller then signals an arm solenoid to energize the arm piston to swing the arm 350, and attached trim, 180; and then a signal is sent causing the finger piston to vent and bias the finger 354 open to release the trim. The microprocessor controller than signals the arm piston to return the arm to the position shown in FIG. 3. After the right arm 158 has carried the waste ribbon away from the cutter, a vacuum, or transvector mechanism, located at the far right of the unit, pulls the scrap away.

The Left Arm Assembly

The left arm assembly 160 is depicted in FIGS. 2 and 3. FIG. 2 is a top view of a portion of the welding fixture 100 showing the left arm assembly 160 affixed to the switch plate 180 at the left end face 198 of the guide plate 186. FIG. 3 depicts the Welding fixture 100 with left arm assembly 160 thereon in perspective. The left arm assembly 160 is substantially identical in pertinent part to the right arm assembly 158. The apparatus of the left arm assembly 160 which is substantially identical to corresponding apparatus of the right arm assembly 158 is identified in FIGS. 2 and 3 with a primed reference character of the same number as the corresponding right arm apparatus. The differences between the right and left arm assemblies 158, 160 are described below.

Because the left arm assembly 160 serves a purpose different from that of the right arm assembly 158, the left arm assembly 160 is oriented at 90 degrees with respect to the orientation of the right arm assembly 158. The axial centerline of the arm support housing 375' is coplaner with the centerline of the V-shaped track 102 within the guide plate 186. The left arm assembly 160 includes a shortened arm 400 having a length sufficient to place the thumb 352' and the finger 354' within the path of the ribbon at the front left corner or the rear left corner of the guide plate 186, depending upon the rotational position of the arm 400. The structure of the left arm assembly is well known in the art, and is described in U.S. Pat. No. 4,629,530 col. 18, line 45 to col 19, line 24, which disclosure has been expressly incorporated herein by reference.

The Track Assembly

The track assembly 162 is shown in FIGS. 2 and 3. The V-shaped track 102 includes an upper surface which has been machined and ground to a smooth finish so as to enable precise alignment of the welding anvil 104 and the ironing anvil 106 and limited friction in movement of the same along the track surface.

Referring now to FIG. 2, the welding anvil 104 includes a surface 108 against which the ribbons are welded and clamped and a cutting edge for severing the ribbons along the weld bead. The welding surface includes a land surface and a cutting edge which cooperates with an upper cutting blade (described below in the section entitled "The Cutter Assembly") in scissor or rotating blade fashion or guillotine action to sever the welded ribbon along the weld bead. The lower surfaces of the welding anvil 104 generally define a V-shaped cross section which conforms precisely to the cross-sectional dimension of the V-shaped track 102. The structure and operation of the welding anvil is well known in the art, and described in U.S. Pat. No. 4,629,530, col. 19 line 25 to col. 20, line 19, which disclosure has been expressly incorporated herein by reference.

The second welding, or ironing, anvil 106 includes a generally horizontal upper ironing surface 110 against which the weld bead may be flattened during the second welding, or ironing, operation. The lower surface of the ironing anvil 106 is machined to a cross section which conforms substantially to the dimensions of V-shaped track 102. The second anvil 106 is preferably located slightly lower than first anvil 104, to permit a slightly greater space between horn 180 and anvil 106 during the ironing operation. The operation of the ironing anvil, and interaction thereof with the welding anvil and the positioning thereof during the welding operations is well known in the art, and is disclosed in U.S. Pat. No. 4,629,530 col. 19, line 25 to col. 21, line 28.

The Cutter Assembly

The cutter assembly 152 is disclosed in FIG. 3. FIG. 3 depicts a perspective view of the welding fixture from the left front side thereof.

Referring briefly to FIG. 3, the cutter assembly 152 includes a support arm 602, a cutter mechanism 604, and a pneumatic cylinder (not shown) which actuates the cutter mechanism.

The operation of the cutter mechanism 604 and its cooperation with the welding anvil 104 to sever the ribbon precisely along a predetermined path within the weld bead is well known in the art, and is disclosed in U.S. Pat. No. 4,629,530, col 21, line 30 to col. 24, line 33.

The Ribbon Clamp and Tensioning Assembly

Figure 11:
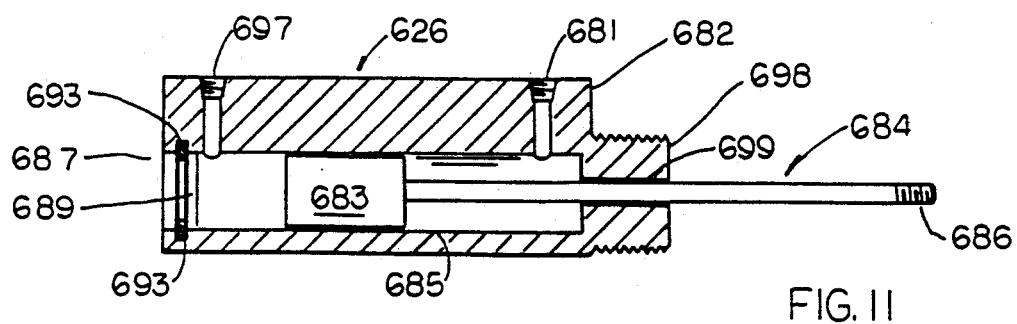
FIG. 11 is a sectional view of the tensioning piston of the tensioning mechanism of FIG. 8 at 11—11.
Figure 8:
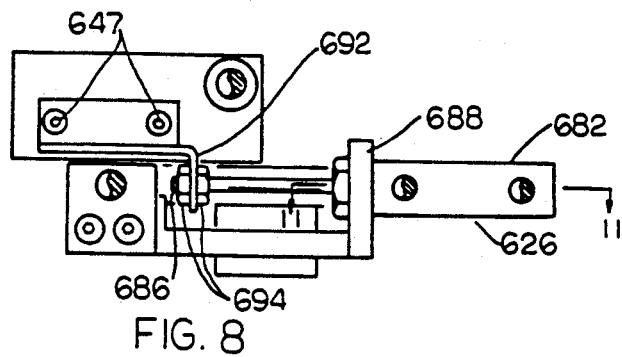
FIG. 8 is a bottom view of the tensioning mechanism of FIG. 4 in the tension "on" position.
Figure 7:
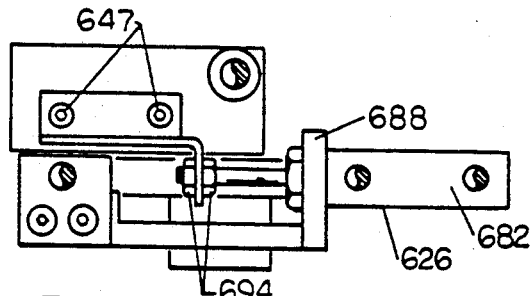
FIG. 7 is a bottom view of the tensioning mechanism of FIG. 4 in the tension "off" position.
Figure 9:
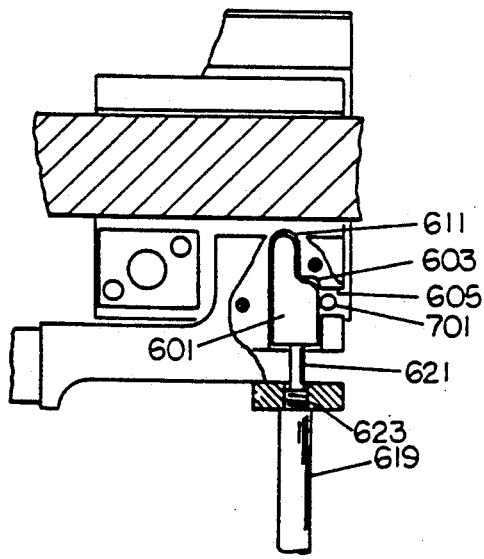
FIG. 9 is a partial cutaway view of the tensioning mechanism of FIG. 4 showing the slide centering mechanism in the "on" position.
Figure 10:
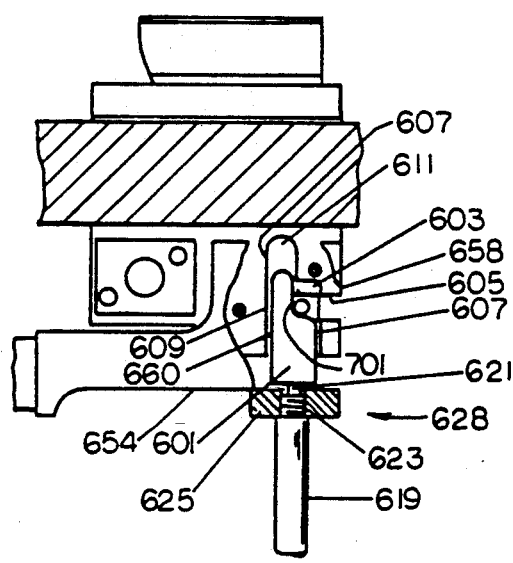
FIG. 10 is a partial cutaway view of the tensioning mechanism of FIG. 4 showing the slide centering mechanism in the "off" position.

FIGS. 2 and 4 to 11 disclose the structure of the ribbon clamp and tensioning assemblies 153c,d. FIG. 2 shows the mounting location of assemblies 153c,d on the switch plate 180. FIG. 4 shows a sectional view of assembly 153d along a line 4—4 in FIG. 2. FIG. 5 is a rear view, partially in cutaway, of the assembly 153d. FIG. 6 is a front view, and FIG. 7 is a bottom view of the assembly 153d, FIG. 8 is a bottom view of the assembly 153d. FIGS. 9 to 11 are cutaway and sectional views of the assembly 153d, showing details of operation.

Referring now to FIGS. 1B 2 and 4, ribbon clamp and tensioning assembly 153d is mounted to switch plate 180 and positioned on switch plate 180 near alignment channel 190d, such that the engagement of gripper mechanism 308 with the ribbon end 114 is in alignment with a line which intersects the center point of the center spaces 208 of the shafts 202 affixed within the alignment channels 190b, 190d. Likewise, clamp 300c is aligned with the line which intersects the center of the shafts 202 in slots 190a and 190c. Switch plate 180 includes, along the right side thereof, slots 620, 621 therein which extend from the right end thereof inward of plate 180 and from the front and rear corners thereof inward at an approximate 60° angle. Slots 620, 621 are located to permit attachment of ribbon clamp and tensioning assemblies 153c,d with clamps 300c, d thereon in proper alignment to clamp the ribbon through the center of slots 190a–d.

Ribbon clamp and tensioning assembly 153d includes slide 301 slidingly engaged on stationary member 622, piston carrier 624, tension piston 626 (FIGS. 7 and 8), reset piston assembly 628 and tension position lock piston 630 (FIG. 13).

Referring now to FIGS. 4 and 10 stationary member 622 is a generally L-shaped member in cross section, having flank 632 formed from the longer portion of the L and a mounting flange 634 forming the leg of the L. Mounting flange 634 includes a plurality of countersunk bores 636 therethrough, for receiving bolts 638 to be received within threaded holes 640 in plate 180 for mounting ribbon clamp and tensioning assembly 153c or 153d thereto. Flank 632 includes bearing race support 642 extending thereon, which is a raised portion thereof having a generally rectangular cross section extending therefrom opposite flank 632. Flange 634 includes an outer face 644 which is an outer extension of flank substantially parallel thereto, and opposed upper and lower bearing faces 646, 648 disposed between flank 632 and face 644. Straight roller bearings 650 are disposed on bearing faces 646, 648. Inner face 652 of stationary member 622 is a flat surface extending from lower edge 654 thereof to the lower surface of flange 634, which includes piston reset extension 662 thereon formed as a partial downward extension of flank 632 below lower edge 654 and lock piston bore 656 (FIG. 13) projecting therethrough adjacent lower edge 654. Piston reset extension 662 includes reset piston slot 658 disposed therethrough in outer edge 664 adjacent lower edge 654, and reset finger slot 660 projecting upward therein from lower edge 654. Reset finger slot 660 is a blind slot, exposed only to lower edge 654 and inner face 652.

Slide 301 is a generally C-shaped section, having outer slide housing 670 terminating in inwardly projecting opposed upper and lower bearing support arms 672, 674 separated by inner slide face 678. Straight bearings 680 are disposed on bearing support arms 672, 674 and engage with and slide over roller bearings 650 disposed on bearing faces 646, 648 of stationary member 622. Upper surface 649 of slide 301 each include a pair of threaded holes 647 FIG. 8 therein. A ribbon alignment plate 651, which forms the upper surface of ribbon clamp and tensioning assembly 153d, is bolted to upper surface 649 of slide 301 to receive ribbon during the welding, cutting and flattening operations.

Referring now to FIGS. 4 7, 8, 10 and 11, tensioning piston 626 includes piston housing 682 rigidly attached to piston carrier 624, and a piston rod 684 projecting therefrom and terminating in threaded stud 686. Piston carrier 624 includes mounting bore 688 therein through which piston housing 682 projects and is secured. Piston carrier 624 is a generally flat plate having an angular flange 690 having mounting bore 688 therethrough, and is bolted to stationary member 622 to cover reset finger slot 660 and reset piston slot 658. Piston rod 684 projects through a bore in a flange 692 in slide mount 691, and is affixed thereto by nuts 694 threaded on the stud 686 on either side of flange 692. Flange 692 is likewise connected to the lower surface 645 of slide 301 through bolts inserted through holes in flange 690 and received within threaded holes 647. Actuation of piston rod 684 in housing 682 will cause slide 301 to linearly actuate on stationary member 622 to tension the ribbon under the welder.

Referring briefly to FIG. 11, tensioning piston 626 includes piston housing 682 and a piston rod 684 projecting therefrom and terminating in threaded stud 686. Tensioning piston is a double sided air bearing piston, having a double sided right cylindrical piston 683 disposed within a right cylindrical piston bore 685. Bore 685 terminates at outer end 687 in a cover 689, which is secured in place with a snap ring 711 recessed into a snap ring groove 693 in bore 685. At piston inner end 695, housing 682 includes a threaded nipple extension 698, having a rod bore 699 therethrough. Piston rod 684 extends through rod bore 699. Air is supplied to tensioning piston 626 through tension port 681 and compression port 697. Tension port 681 is disposed through housing 682 to inject pressurized air to the front of piston 683 to bias piston away from the welder, thereby tensioning the ribbon. Compression port 697 is disposed on housing 682 to access the rear side of piston 683, to bias piston toward the welder thereby relieving compression on the ribbon. Piston bore 685 has a diameter of preferably two to three thousandths greater than the outer diameter of straight sided cylindrical piston 683. Further, rod bore 699 is approximately five thousandths larger in diameter than rod 684, leaving a clearance between adjoining sliding parts of approximately two and one half thousandths of an inch. When the piston is energized with air through ports 681, 683, the air bleeds through this clearance forming a supporting cushion of air between piston 683 and bore 685 and between rod 684 and bore 699. This structure eliminates hysteresis in the piston which would occur with seals.

Referring now to FIGS. 6 and 13, tension position lock piston 630 is located on ribbon clamp and tensioning assembly 153d to lock slide 301 to stationary member 622 during welding. Referring to FIG. 13, lock piston 630 is located on inner face 652 of stationary member 622 over lock piston bore 656. Lock piston 630 includes a lock piston housing 631 having a reciprocable piston (not shown) disposed therein, an air port 635 disposed therethrough to inject air behind piston (not shown) to actuate piston 630 to lock ribbon clamp and tensioning assembly 153d during welding operations. Air port 635 is threaded (not shown) to attach a fitting 637 to receive an air hose 639 for air supply. To lock stationary member 622 to slide 301, the piston includes a lock rod 633 disposed thereon and extending outward housing 631 into piston bore 656 and includes a rubber bumper 641 disposed on the terminal end thereof outward housing 631. To lock slide 301 to stationary member 622, air is supplied to air port 635 thereby actuating the piston and rod 633 against slide 301 such that bumper 641 interferingly engages slide 301 adjacent bearings 650 (FIG. 4) and lower bearing support arm 672. Piston 631 is spring biased such that when air is not applied thereto, bumper 641 retracts from slide 301 into piston bore 656 permitting slide 301 to actuate freely with respect to stationary member 622.

The tensioning piston reset assembly 628 is shown in FIGS. 4, 9 and 10. FIG. 4 shows a sectional view of the ribbon clamp and tensioning assembly 153d showing the reset piston slot 658. FIGS. 9 and 10 show the actuation of the reset piston assembly 628 used to center tensioning piston 626 (FIG. 7). Referring briefly to FIGS. 9 and 10, piston reset assembly 628 includes a spring loaded piston housing 619 having a finger rod 621 extending therefrom inward of reset finger slot 660. Housing 619 includes a threaded nipple end 623 which is threaded into a mounting plate 625 having a plurality of countersunk bores 627 (only one shown) therethrough. Lower edge 654 of piston carrier 624 has a plurality of corresponding tapped holes 629 (only one shown) therein, which receive screws 631 to secure mounting plate 625 thereto and thus to stationary member 622 such that finger rod 621 extends into finger slot 660. Reset finger 601 is disposed against the terminal end of finger rod 608 and in finger slot 660.

Referring now to FIGS. 4, 9 and 10, finger slot 660 has a major portion 603 extending from lower edge of stationary member 622 inward beyond the upper edge 605 of reset piston slot 658 and bounded by an outer wall 607 which is intersected by reset piston slot 658 and an inner wall 609 extending substantially parallel thereto, and a minor portion 611 located inward of major portion 603. Minor portion 611 is approximately one half of the width of major portion 603, and share inner wall 607 therewith. Minor portion 611 terminates in radial wall 613 inward of stationary member 622 from major portion 603. Finger 601 is conformed to match the profile of finger slot 660, and includes major finger portion 615 attached to finger rod 621 and minor finger portion 617 extending inward stationary member 622 to be selectively received in minor portion 611. Finger 601 further includes bearing wall 606 disposed thereon adjacent to reset piston slot 658 and a secondary bearing face 618 adjacent to the intersection of minor finger portion 601a and major finger portion 601b opposite inner wall 607

A pin 701 is disposed in slide 301, projecting from lower bearing wall 672 to be received within reset piston slot 658. After a welding cycle is completed, tensioning piston 626 is actuated such that piston is fully retracted away from the welder, and pin 701 is resultingly retracted from reset piston slot 658. Reset piston 628 is then actuated, forcing rod 621 against spring bias within piston housing 619 to actuate finger 601 upward into finger slot 660 bringing bearing wall 606 over and into blocking position with reset piston slot 658. Tensioning piston 626 is then actuated inward toward the welder, bringing pin 701 against bearing wall 606. The bearing wall 606 is located with respect to slide 301 and pin 701 such that when pin 701 abuts against bearing wall, slide is located at the center of its lateral travel limits. This position is shown in FIG. 9.

To limit slide travel, secondary bearing wall 618 is positioned into alignment with pin 701 travel by releasing the air pressure from piston 628, thereby permitting the spring therein to actuate the finger 601 downward and thus placing secondary bearing wall 618 in position to receive pin 701 upon inward overtravel of slide 601. This position is shown in FIG. 10.

The Pneumatic Schematic

Figure 12A:
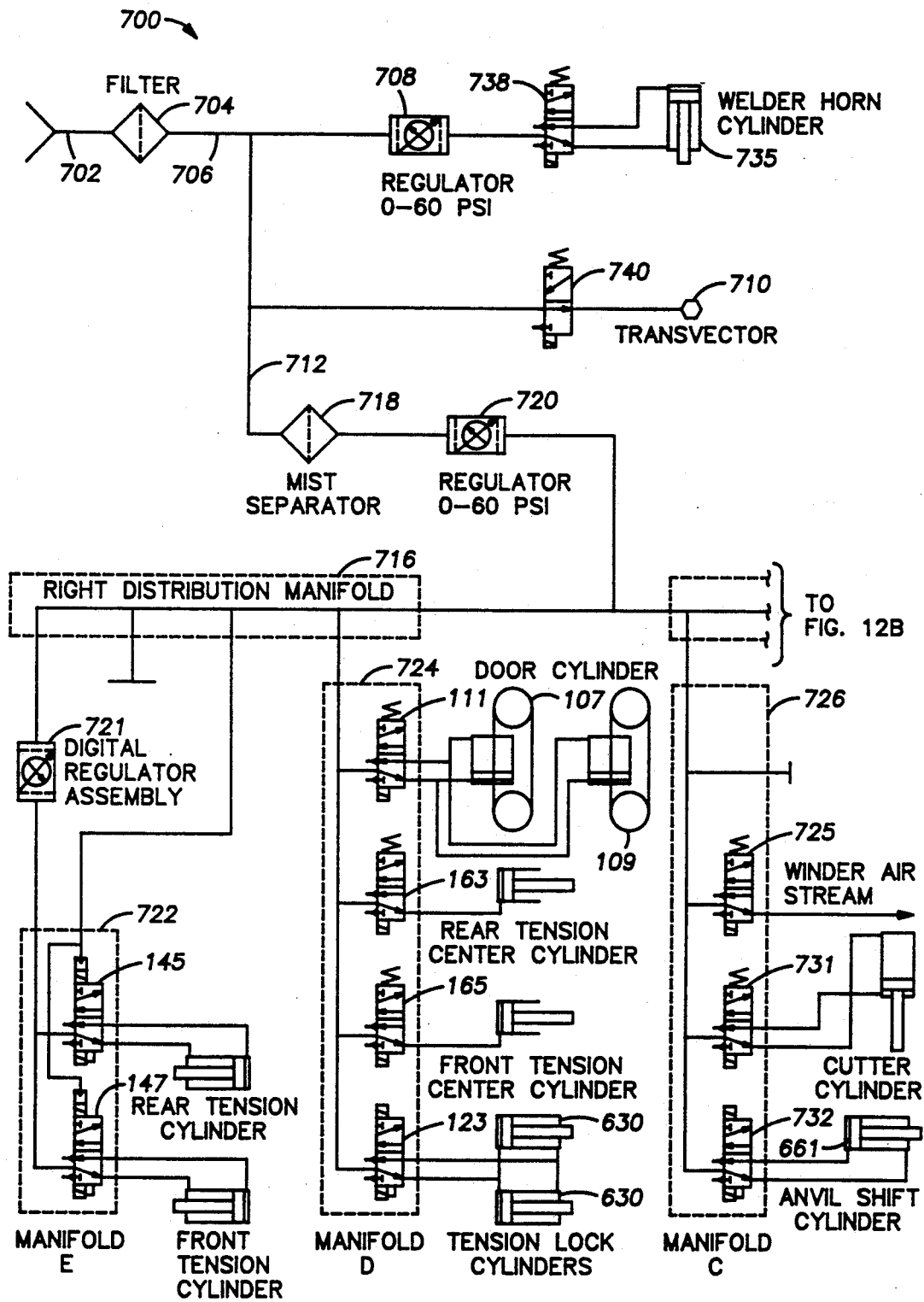
FIGS. 12A and 12B show pneumatic schematic for the continuous loop ribbon welding system of the present invention.
Figure 12B:
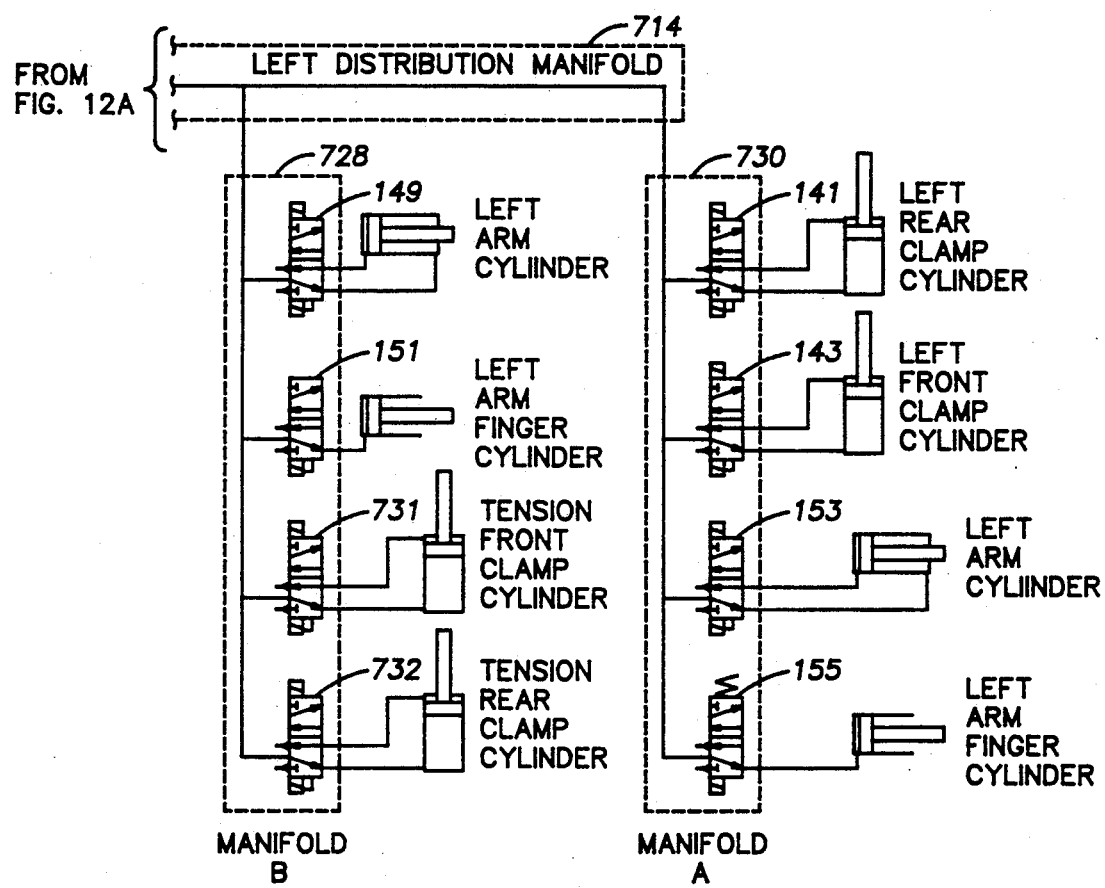

FIG. 12 shows the pneumatic schematic for the ribbon welder. Each of the pneumatic cylinders used to control or actuate the equipment is controlled through a microprocessor controlled solenoid valve. The microprocessor sends a digital signal to each of the various control solenoids, causing the solenoid to actuate and perform a manufacturing function.

Referring now to FIG. 1, 2, 3, 5 and 12, pneumatic system 700 is sourced from a pneumatic pressure source 702 which supplies air at a relatively constant pressure to the system 700. The air, or working fluid, is passed through a filter 704 to filter out possible impurities which would potentially cause the equipment to jam or fail. The filtered air is then ported to a filtered supply line 706 which supplies a horn regulator valve 708, a transvector valve 710 and a main manifold supply line 712. Supply line 712 supplies regulated dried air to left distribution manifold 714 and right distribution manifold 716. The air is dried in a mist separator 718 which is located upstream of the manifolds 714, 716, and a regulator valve 720 disposed between mist separator 718 and manifolds 714, 716. Regulator 720 is adjustable to supply air to manifolds 714, 716 at pressures of between 0 and 60 p.s.i.

Right distribution manifold 716 supplies the working air to the tensioning locks and centering cylinders, and the door cylinders. The tensioning pistons 626 are supplied through a secondary manifold E 722. The remaining right distribution manifold also supplies a Manifold D 724 which supplies the reset cylinders, lock cylinders and door cylinders. The left manifold supplies the remaining pneumatic components through manifolds A, B and C, 726, 728 and 730.

Manifold E 722 is ported to supply rear tension cylinder selenoid 145 and front tension cylinder selenoid 147. Solenoids 145 and 147 control the transmission of pressurized air to either side of the tensioning pistons 626, as to to control the initiation and duration of the tensioning of ribbon portions 114, 116 (FIG. 1A). Manifold E 722 further includes a digital regulator assembly 721 which is controllable to finely control the pressure in manifold E and thereby the tensioning pressure in tensioning pistons 626. Digital regulator assembly 721 is ported with manifold E such that fine pressure regulation only occurs on the tensioning side of tensioning piston 626.

Manifold D 724 supplies door control solenoid 111, rear tension centering selenoid 163, front tension centering selenoid 165 and tension cylinder lock control solenoid 723. Each of solonoids 111, 163, 165 and 723 control a corresponding cylinder or piston used to operate the welding sequence.

Manifold C 726 supplies a winder air stream selenoid 725, cutter control selenoid 727 and anvil shift control solenoid 159. Winder air stream solenoid controls the air supplied to an optional air or electric motor powered winder which may be used to rewind the ribbon into a cartridge. Cutter control solenoid 727 controls the cylinder which actuates the cutter. Solenoid 159 controls the actuation of anvil cylinder 161 which shifts the anvils 104, 106 under the horn 180.

Manifold B supplies right arm control solenoid 149, right arm thumb control solenoid 151, and front and rear tension clamp control solenoids 731, 732. Selenoid 149 controls the air pressure supply to the right arm 158 to actuate arm 158 between its first position adjacent to the anvils 104 or 106 and its second position adjacent to the right end of plate 180. Solenoid 151 controls the cylinder which opens and closes finger 354 on arm 158. Solenoids 731, 732 control pistons 304 which controls the position of clamps 300c, d.

Manifold A 730 supplies pressurized air to clamp control solenoids 141, 143, and reversing arm and reversing arm thumb control cylinders. Solenoids 141, 143 selectively supply air to the cylinders which actuate clamps 300a, b between the open and closed positions. Solenoid 153 controls the supply of air to the left arm 160 to actuate it between its first position adjacent to the front of guide plate 186 and its second position adjacent to the rear of guide plate 186. Solenoid 155 controls the cylinder which actuates thumb 352' between its open and closed position.

Horn regulator valve 708 may be adjusted to control the air pressure on horn ram 736 through horn control solenoid 738. Solenoid 738 is controllable to move horn 180 between the up position and the lowered position for welding.

Transvector 710 is a vacuum generator which is selectively actuated through transvector solenoid 740. Transvector 710 is actuated to pull the scrap ribbon after cutting.

The Operating Sequence

Figure 14:
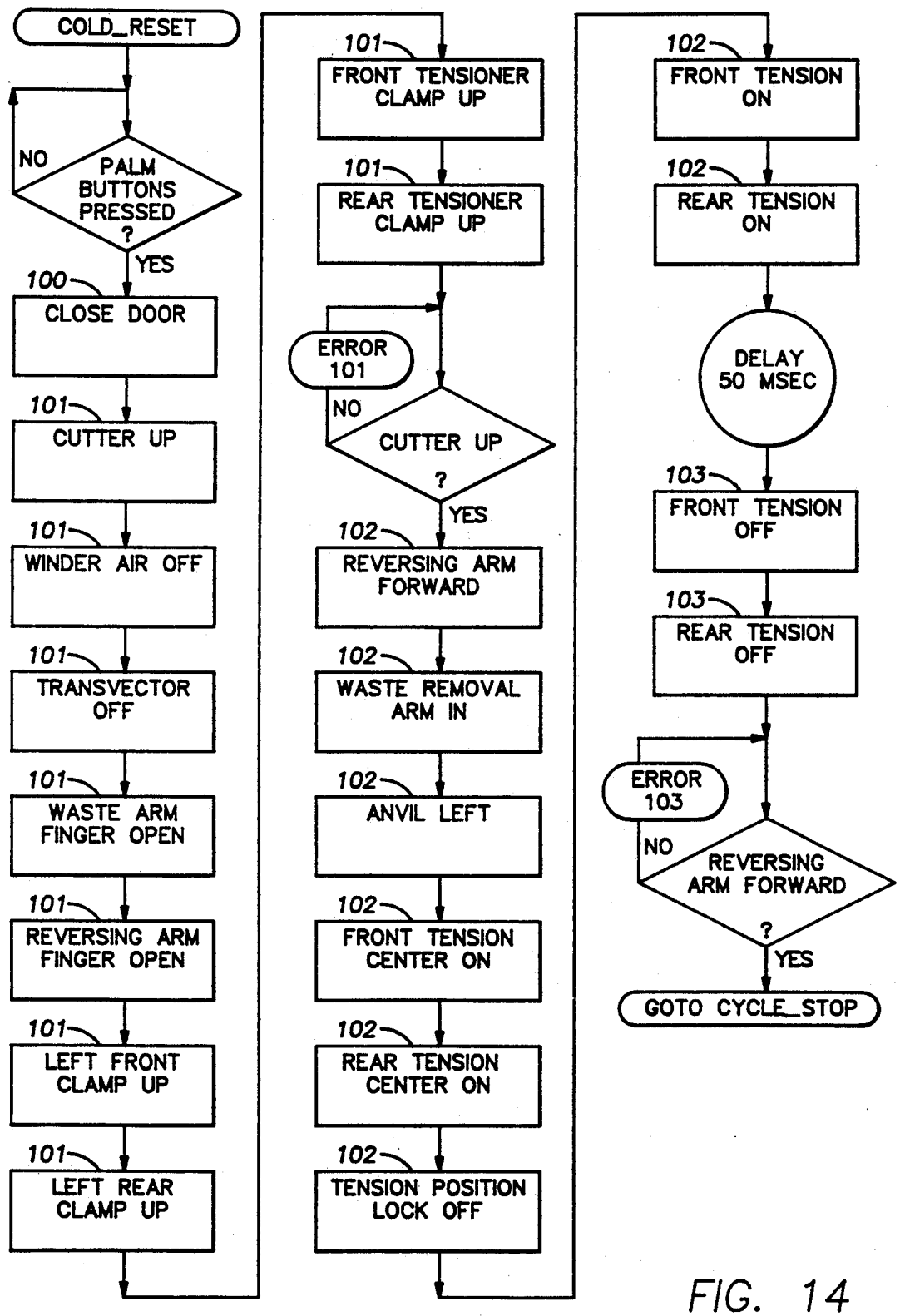
FIG. 14 is a schematic flow diagram of the cold reset step sequencing for the continuous loop ribbon welding system of the present invention.
Figure 15:
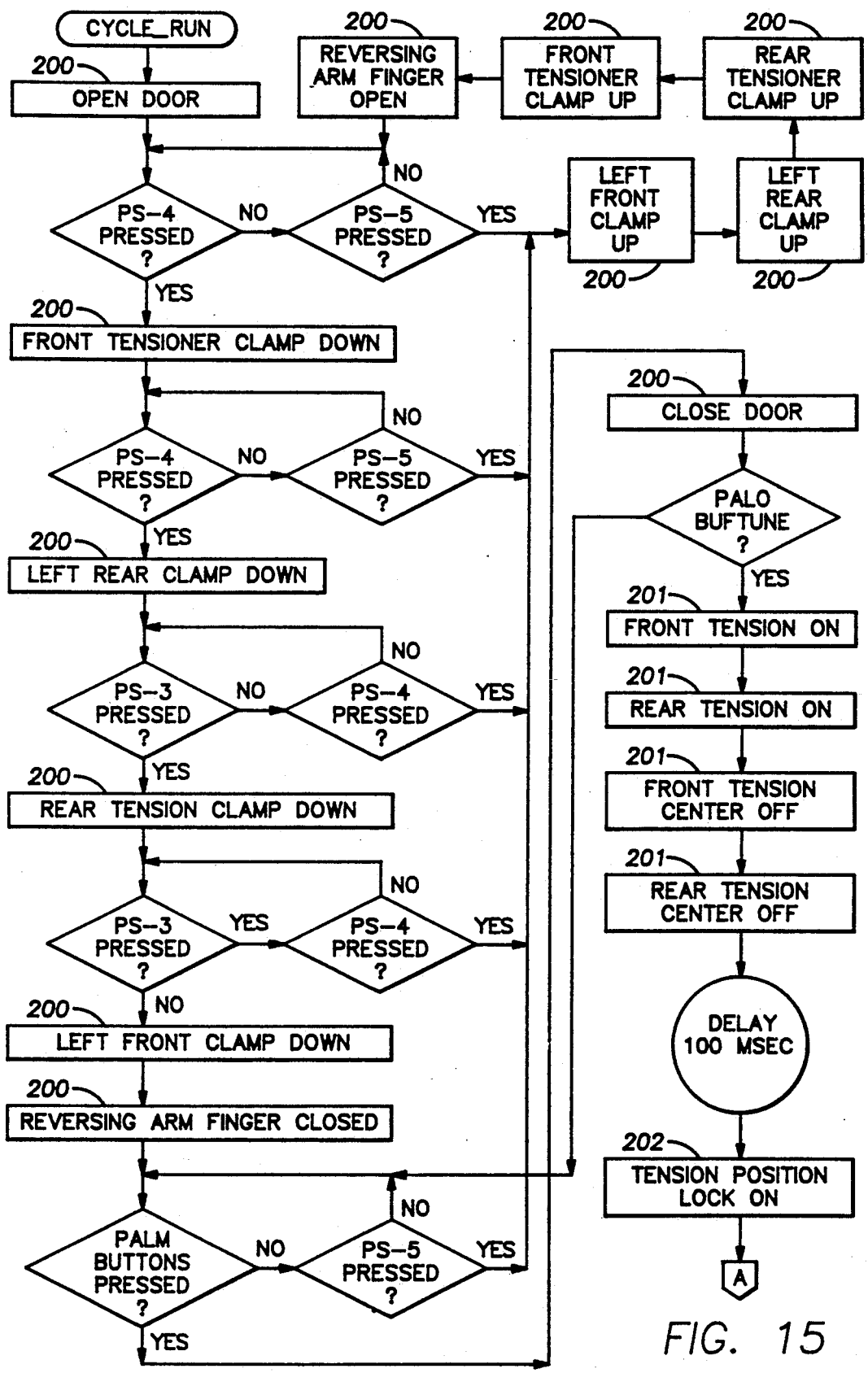
FIGS. 15, 16 and 17 are a schematic flow diagram of the step sequencing for the continuous loop ribbon welding system of the present invention.
Figure 16:
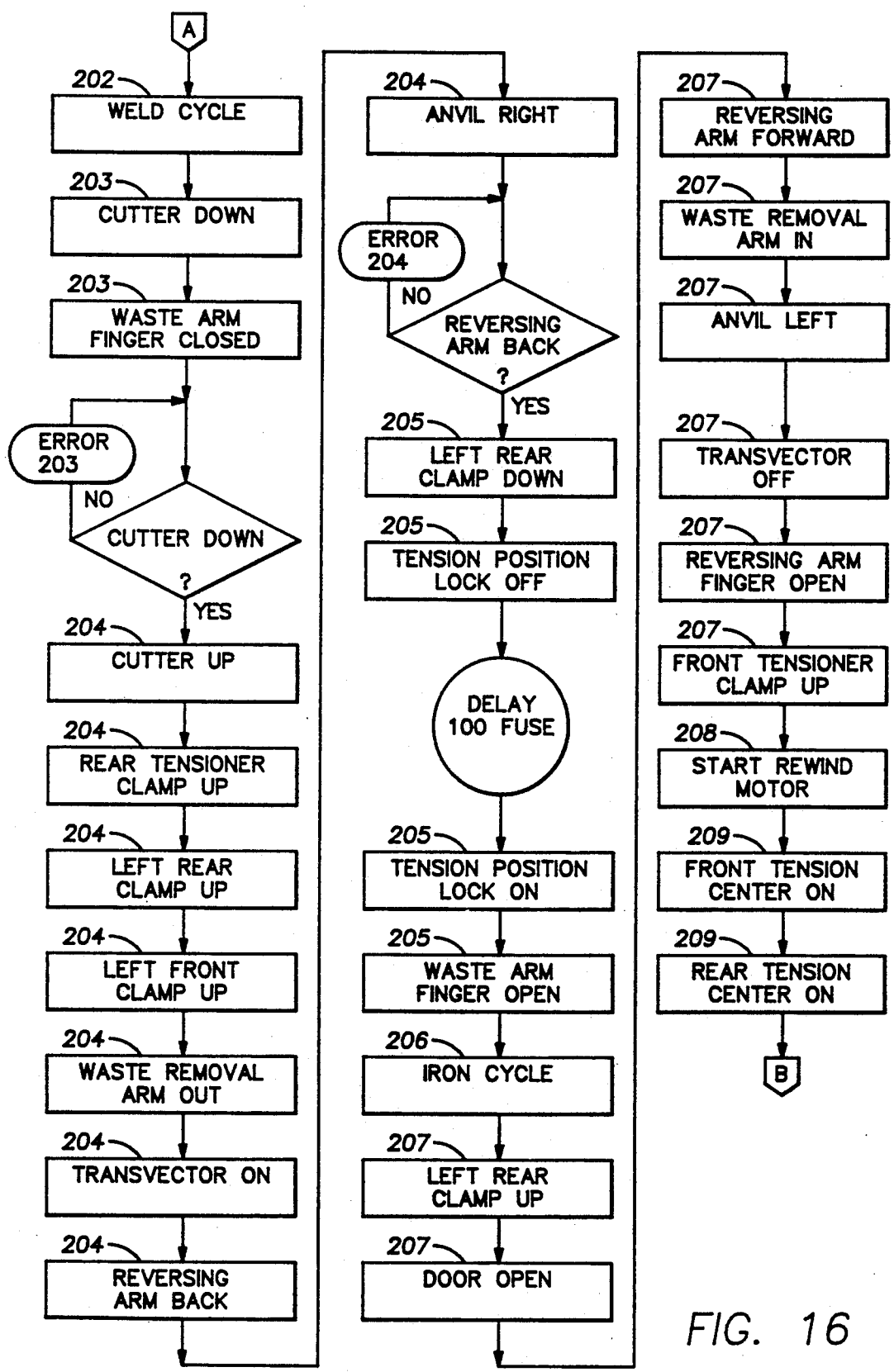
Figure 17:
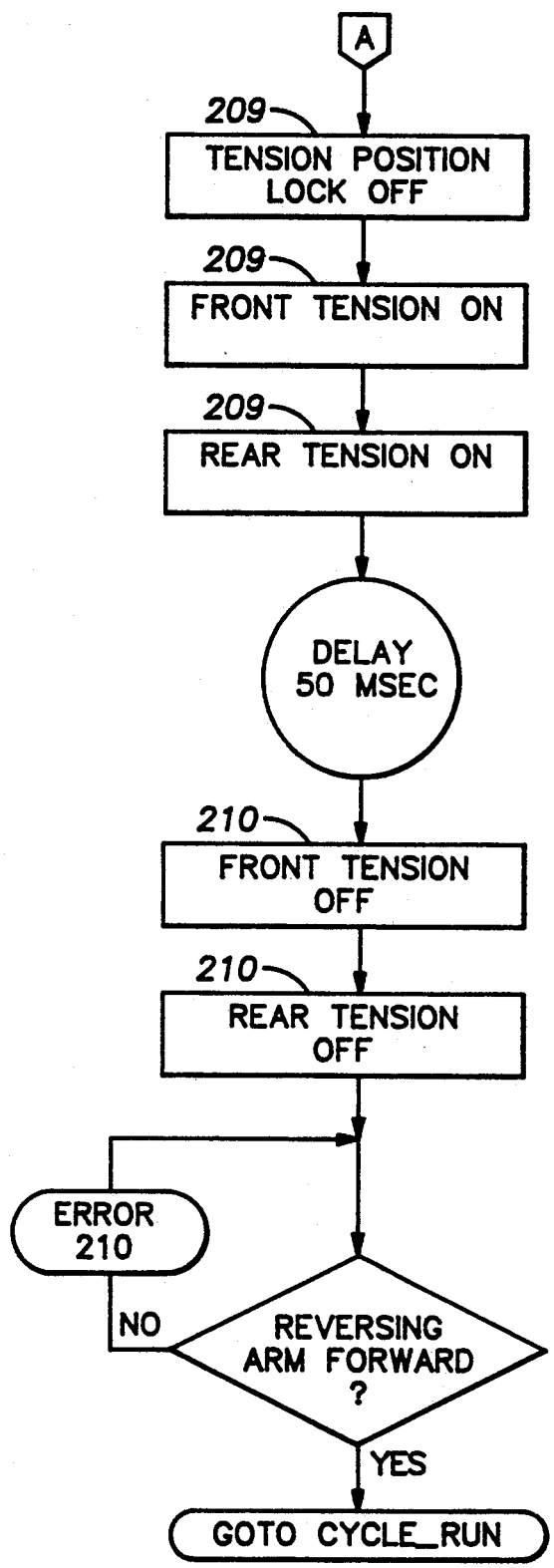

Referring now to FIGS. 13, 14, 15 and 16, the operating sequence of the Continuous loop ribbon welding system is shown. The cold start up procedure is shown in FIG. 14. FIGS. 15, 16 and 17 show the operating procedure during welding of ribbon ends.

Referring now to FIGS. 1 through 14, cold start up of the welder requires sequencing of various operations to ensure that the welder will satisfactorily operate. To initiate operation, the operator depresses palm buttons, or actuation switches 171a, b on the right and left hand side of the cabinet 105 holding the apparatus, and door comes down over the front opening of the cabinet to protect the operator from injury. The door is closed by hydraulic door cylinders 107, 109 fed from dual position door solenoid 111. Door cylinders 107, 109 are dual ended piston cylinders, and door solenoid 111 is actuated by a signal from microprocessor controller 120 to open or close doors by communicating pressurized air from to either side of the door cylinders 107, 109. Once the door is closed, the microprocessor controller 120 transmits a signal to the cutter piston to move the cutter mechanism 604 up, to close the solenoid supplying the winder, to turn the winder air off, the vacuum off, to actuate the cylinder controlling finger 354 to open finger 354 on right arm assembly 150, to open the finger 354 on the left arm assembly 160, to actuate the clamp cylinder solenoids 141, 143 to actuate the cylinders controlling the ribbon clamps to actuate the ribbon clamps 300a, 300b upward, and actuate tensioner solenoids 145, 147 in manifold E 722 to engage pressurized air to cylinder 304, so as to generate vertical motion of the shaft 306 and move gripper mechanisms 308c and 308d upward. The microprocessor controller 120 sends the appropriate signal to each solenoid to cause the appropriate cylinder to actuate in the proper position to place the componentry in the above referenced positions. However, as each component is controlled by cylinders and solenoids, if a component is already in the cold reset position, the signal will not effect its position. Once the first part of the cold reset cycle is completed, as described above, the microprocessor controller 120 sends a signal to a position sensor located adjacent to cutter mechanism 604 to determine whether cutter mechanism 604 is in the up position. If the sensor does not signal back to the microprocessor controller 120 that the cutter mechanism 604 is up, the microprocessor controller 120 will continue signaling the sensor until a specified period has elapsed, at which time the microprocessor controller 120 will transmit an error message to the control console 800, indicating that the cutter is not up. If the sensor is at fault, the operator may replace it. The sensor is important, because the cutter must be up when the anvils 104, 106 are moved, or damage to the anvils 104, 106 and cutter mechanism 604 may occur.

Once the microprocessor controller 120 logic circuitry has confirmed that the cutter mechanism 604 is in the up position, the left arm actuating piston is energized to actuate left arm 160 into location adjacent to the center of the fixture by solenoid 155, which receives a signal from microprocessor controller 120 which causes solenoid 155 to evacuate pressure from one side of left arm piston and directs pressure to the opposite side to pull left arm assembly 158 into position.

The microprocessor controller 120 logic circuitry then signals right arm solenoid 149 to supply air to right arm piston to actuate right arm 158 into location adjacent the center of the fixture. Solenoid 149 receives a signal from microprocessor controller 120 which causes solenoid 149 to evacuate pressure from one side of right arm piston and directs pressure to the opposite side to pull right arm assembly 158 into position.

Microprocessor controller 120 next signals the anvil shift solenoid 159, which controls the actuation of double sided cylinder 161 controlling anvil. Double sided anvil cylinder 161 is a double acting piston cylinder, such that air pressure on the first side of the piston will actuate anvil 104 left, and air pressure on the second side of the piston will move anvil 104 to the right. During the cold start procedure, the signal received from the microprocessor controller 120 actuates solenoid 159 to cause anvil 104 to move left.

Microprocessor controller 120 next signals solenoids 163, 165 to supply air to front and rear tension centering cylinder piston housings 619c, d. At the same time, the lock piston solenoid controlling the lock pistons 630 on the front and rear ribbon clamp and tension assemblies 153c, d receives a signal from microprocessor controller 120 causing it to exhaust air pressure from air port 635 on piston 630 thereby exhausting air from lock piston 630 causing bumper 641 to actuate away from slide 301 into bore 656 allowing slide 301 to freely actuate. Microprocessor controller 120 the signals tensioning solenoids 145, 147 controlling front and rear tensioning pistons 626a, b to actuate the pistons to the tension position.

After a preprogrammed thirty millisecond delay, microprocessor controller 120 signals tensioning solenoids 145, 147 to exhaust air from the tension side of the tensioning pistons 626c, d and pressurize their opposite sides. The left arm solenoid 153 next receives a signal, causing solenoid 153 to properly pressurize left arm piston to actuate left arm assembly 160 into the forward position adjacent the front of the cabinet 105. If the arm is not sensed as being forward, the microprocessor controller 120 will again signal left arm solenoid 153 to move left arm 160 forward. Again, if the sensor does not send the proper signal to the microprocessor controller 120, an error message will appear and the cycle will stop. However, if no error or fault occurs, the apparatus is ready for welding of ribbon ends.

The Manufacturing Sequence

Referring now to FIGS. 1 through 17, the operating sequence for manufacturing welded ribbon is disclosed. To begin the operation, the operator places a ribbon end through the open door across adjustment channels 190b and 190d, and a second ribbon across adjustment channels 190a and 190c between guide bars 210a, b in each channel 190a-d. After the first ribbon end is placed across channels 190b and 190d, the operator depresses clamp switch 302b, which signals the microprocessor to actuate the solenoid controlling tension clamp cylinder 304 to actuate clamp 300d downward to grip the ribbon. The operator then depresses the clamp switch 302b a second time, and solenoid 143 controlling the cylinder controlling clamp 300b actuates clamp 300b downward to grip the ribbon. Likewise, after placing the second ribbon end across channels 190a, c, the operator depresses front clamp switch 302a, causing clamp 300c on slide 301 to grip the ribbon. The operator then presses clamp switch 302a a second time, and clamp 300a actuates downward to grip the ribbon. If any of the steps are performed incorrectly, or if the ribbon is misaligned, then the operator depresses the reset button 314 on switch plate 180 adjacent to the left side of guide plate 186, which signals the microprocessor controller 120 to open each clamp 300a-d and to open the right arm finger 354 so that the operator may reinitiate the ribbon laying sequence. The pressing of switches 302a, b and the pressing of reset button 314 operates switches by sending a digital signal to microprocessor controller 120 which then actuates the appropriate solenoids to actuate the appropriate pistons to actuate the clamp and arm components.

Once the ribbon is in place, the operator presses the palm buttons 171a, b and the door closes and the microprocessor controller 120 begins automatic operation. The controller 120 signals the appropriate solenoids to actuate the tensioning pistons 626 on each tensioning assembly 153c and 153d, and likewise actuates piston 619 to retract centering finger 610. This sequence of operation permits the tensioning pistons 626 to pull slides 301 to tension the ribbon. The microprocessor controller 120 is programmable to control the solenoid supplying the tensioning piston 626 to receive air at between 3 and 15 p.s.i. The microprocessor also receives, by operator input, the code number for the material being welded. The microprocessor controller 120 includes, in memory, preprogrammed instructions which supply the basis for selection of the proper tensioning pressure. This information is developed by welding and then testing welds on ribbon, and determining the optimum pressure to obtain the optimum weld strength.

After a one hundred millisecond delay, the lock piston 630 is actuated to press bumper 641 against slide 301 which secures slide 301 against movement. The horn 180 is then lowered, and the microprocessor signals the horn to control the weld time, hold time and afterburst time. Horn 180 includes transport assembly to guide horn 180 into engagement with the ribbon, a power supply which energizes the horn to ultrasonically weld the ribbon and horn stack assembly including the horn energizing components. When horn 180 is lowered adjacent the ribbon, a switch is triggered, which sends a signal to the microprocessor to begin timing the horn operation sequence. The microprocessor is programmable to vary the pre-weld delay time and afterburst duration from ten to one hundred milliseconds, and the weld and hold time from ten to five hundred milliseconds, or longer if required. The microprocessor controller 120 memory contains the proper parameters of delay, hold, weld and afterburst time, which are loaded therein after acquisition through trial and error testing for each fabric ink combination.

After the weld cycle is complete, the microprocessor controller 120 signals the horn solenoid to actuate the horn up. Once horn 180 is in the up position, the solenoid controlling the cutter cylinder is signalled, and the cutter 604 comes down to trim the ribbon. The right arm finger 354 then closes on the ribbon before the cutter arm comes down. The microprocessor controller 120 signals a sensor to be certain that the cutter 604 is down. If the cutter 604 is not down, or the sensor is not operating, the controller recycles the cutter solenoid to ensure that the cutter 604 is down. If the cutter 604 still does not actuate the sensor, the microprocessor stops the operation and an appropriate error message is transmitted to the console for display.

If the cutter 604 is detected down in the cutting position, the microprocessor 120 then signals cutter solenoid to actuate the cutter 604 up. The solenoids controlling tensioning clamp 300c, and clamps 300a and 300b are signaled, actuating the appropriate pistons to open the clamps 300a, b and c. Right arm solenoid 149 is then signalled, and right arm cylinder is properly actuated to swing the scrap cut by cutter 604 to the right side of plate 180. A vacuum, or transvector, is then signalled to the on position, and the solenoid 151 controlling finger 354 is signalled to drop the waste into the vacuum for disposal. Left arm solenoid 153 is then signaled, causing the left arm piston to flip left arm 160 which exposes the weld nib to the ironing anvil 106 which simultaneously was moved into the place of anvil 104. Solenoid 151 received a signal to shift anvil cylinder 161 to the right, disposing ironing anvil 106 under horn 180. At this point the microprocessor controller 120 again performs a status check, determining with a sensor adjacent the left arm 160 to be certain left arm 160 is moved to expose the nub. If the arm 160 has not moved, or the sensor is inoperative, the microprocessor signals the arm solenoid 155 again, to cause left arm 160 to move. If the movement still does not occur, or the sensor has failed, the microprocessor shuts the sequence down and an error message is sent to console 800 for display.

Actuation of left arm 160 places the left ribbon end under the area of clamp 300b. The microprocessor 120 next signals the solenoid controlling clamp 300b to actuate and grip the ribbon end therebeneath. The tension position look 630 is then signalled to retract bumper 641, and the tension slide 301 will actuate to put tension on the welded ribbon. After a preprogrammed one hundred millisecond delay, the piston 630 is again signalled to engage bumper 641 against slide 301, locking slide 301 in position. The horn 180 is then actuated downward to engage the ribbon and flatten the nib. The microprocessor 120 signals the horn 180 to control the weld time, hold time and afterburst time. The microprocessor is programmable to vary the time pre-weld delay time and afterburst duration from ten to one hundred milliseconds, and the weld and hold time from ten to five hundred milliseconds, or longer periods of time if required. The microprocessor controller 120 memory contains the proper parameters of delay, hold, weld and afterburst time, which are loaded therein after acquisition through trial and error testing for each fabric ink combination.

After the ironing operation, the horn 180 is moved upward in response to a control signal, and the microprocessor signals the appropriate solenoid to open the door. The solenoids controlling left and right arms 158, 160 are then signalled to actuate left and right arms 158, 160 into their original position, and the anvil solenoid 159 is signalled to move the anvil left to place welding anvil 104 under horn 180. The vacuum is signalled off, left arm finger 658 is opened, clamp 300d is released and the winder is turned on. The winder is a separate component which rewinds the just welded tape into its cartridge. The winder may be an air powered winder, the air supply for which may be controlled by controller 120, or an electric powered winder. Tension centering pistons are then turned off, and the tension position lock piston is deenergized, retracting bumper 641. The tension cylinder solenoids 145, 147 then receive an on signal to actuate the tension pistons 626 to the on position. After a fifty millisecond delay, the tension position solenoids 145, 147 receive a signal to turn the tensioning off by reversing tensioning pistons 626. At this point a new weld cycle may begin.

The use of the microprocessor controller 120 to control the operating sequence allows simple control and operation of the welder. Further, the microprocessor allows independent control of the welding and ironing operations, which results in a stronger, more reproducible, weld.

Selective tensioning of the ribbon to discrete tension levels permits the operator to select the optimum tension for any given ribbon fabric type and/or fabric ink combination. Unlike the prior art welders where the tension was not easily adjustable, the present invention permits the selection of ribbon tension independent of operator bias or perception, resulting in readily reproducible welds leading to repeatable results. Further, as the tensioning piston 326 is actuated by a specified pressure for each specific welding operation, if the operator overtensions the ribbon when loading the ribbon into the clamps 300a-d, the piston 326 will compensate for the over tension. The piston 326, when applied where the ribbon is overtensioned, will actuate toward the welder horn 180 because the pressure actuating right circular piston 682 away from horn 180 will create insufficient force on slide 301 to sustain the preloaded tension in the ribbon and the ribbon will relax back to the preselected tension.

I claim:

1. Apparatus for adjoining two segments of a ribbon made of a fusible material, comprising
   means for securing the two ribbon segments in overlapping position,
   means for applying tension to the overlapping portion of at least one ribbon segment after it is secured by the securing means,
   means for selecting the optimum tension for the ribbon,
   means for adjusting the tension applying means to apply the optimum tension, and
   means for fusing the two ribbon segments together within the overlapped portions.

2. Apparatus according to claim 1,
   further comprising means for supporting the two ribbon ends; and
   wherein said securing means comprises
   first and second means for clamping therebetween a first ribbon end, said first clamping means being affixed to said supporting means, and
   third and fourth means for clamping therebetween a second ribbon end, said third clamping means being affixed to said supporting means; and
   wherein said tension applying means comprises
   first means for carrying said second clamping means, said first carrying means being movable relative to said supporting means along a line defined by said first and second clamping means,
   second means for carrying said fourth clamping means, said second carrying means being movable relative to said supporting means along a line defined by said third and fourth clamping means, and
   first and second means for causing motion of said first and second carrying means, respectively, the force imparted by said first and second motion causing means being adjustable and substantially repeatable, whereby a predetermined tension can be applied to the first and second ribbon ends.

3. Apparatus according to claim 2,
   wherein said first and second carrying means have predefined limits of motion relative to said supporting means, and
   wherein said tension applying means further comprises first and second means for initially positioning said first and second carrying means away from their respective limits of motion, whereby said first and second carrying means can move toward or away from said first and third clamping means, respectively, in response to said motion causing means, the direction of motion depending on whether the tension applied to the first and second ribbon ends by said securing means before activation of said motion causing means is greater than or less than, respectively, the predetermined tension imparted by said motion causing means.

4. Apparatus as defined by claim 1 wherein said tension applying means has substantially no hysteresis.

5. Apparatus as defined by claim 1 wherein said tension applying means comprises a double sided air bearing piston.

6. Apparatus as defined by claim 1 wherein the amount of tension applied by said tension applying means is independent of the tension applied to the ribbon ends by an operator in securing the ribbon ends in position for applying tension.

7. Apparatus as defined by claim 1 wherein the tension adjusting means includes means for either increasing or decreasing the applied tension.

8. Apparatus as defined by claim 2 and including means for returning the second and fourth clamping means to substantially their original positions after the ribbon ends are adjoined.

9. Apparatus as defined by claim 8 wherein said tension applying means has substantially no hysteresis.

10. Apparatus as defined by claim 8 wherein said tension applying means comprises a double sided air bearing piston.

11. Apparatus as defined by claim 10 and including a controllable regulator to control the pressure of air fed to said piston.

12. Apparatus as defined by claim 1 wherein the tension adjusting means is capable of either increasing or decreasing the applied tension.

13. Apparatus for adjoining two ends of a length of fabric printer ribbon to form a continuous loop of printer ribbon, comprising:
    a plate having first and second sides, a front portion, and a rear portion, the second side including front and rear tensioning slots formed therein;
    first and second means for positioning the two ribbon ends in an x-pattern;
    first and second means for clamping a first ribbon end within said first positioning means, said first clamping means being affixed to said plate;
    third and fourth means for clamping a second ribbon end within said second positioning means, said third clamping means being affixed to said plate;
    means for tensioning said first ribbon end, said first tensioning means being disposed in the front tensioning slot and being slidable relative to said plate along a line defined by said first positioning means, said second clamping means being affixed to said first tensioning means;
    means for tensioning said second ribbon end, said second tensioning means being disposed in the rear tensioning slot and being slidable relative to said plate along a line defined by said second positioning means, said fourth clamping means being affixed to said second tensioning means;
    means for fusing the two ribbon ends along a weld bead, said fusing means adjoining the two ribbon ends to form a continuous ribbon loop with two waste ribbon ends extending from the weld bead;
    means for cutting the two waste ribbon ends from the ribbon loop close to the weld bead; and
    means for selecting the optimum tension for the ribbon ends,
    wherein both said first and second tension means include means for adjusting the tension to be applied to said first and second ribbon ends, respectively, to an optimum tension.

14. Apparatus according to claim 13, wherein both said first and second tensioning means include means for adjusting the tension to be applied to said first and second ribbon ends, respectively, whereby the tension applied by said first and second tensioning means to the fabric printer ribbon ends may be optimized.

* * * * *